(12) United States Patent
Jakel et al.

(10) Patent No.: US 12,213,497 B2
(45) Date of Patent: Feb. 4, 2025

(54) METHOD AND SYSTEM FOR PRODUCING A PROTEIN AND FIBER FEED PRODUCT FROM A WHOLE STILLAGE BYPRODUCT PRODUCED IN A CORN DRY MILLING PROCESS

(71) Applicant: Fluid Quip Technologies, LLC, Cedar Rapids, IA (US)

(72) Inventors: Neal Jakel, Cedar Rapids, IA (US); John Kwik, Bellbrook, OH (US)

(73) Assignee: Fluid Quip Technologies, LLC, Cedar Rapids, IA (US)

( * ) Notice: Subject to any disclaimer, the term of this patent is extended or adjusted under 35 U.S.C. 154(b) by 98 days.

(21) Appl. No.: 17/723,537

(22) Filed: Apr. 19, 2022

(65) Prior Publication Data

US 2022/0361525 A1 Nov. 17, 2022

Related U.S. Application Data

(60) Provisional application No. 63/187,453, filed on May 12, 2021.

(51) Int. Cl.
*A23K 10/38* (2016.01)
*A23K 30/20* (2016.01)
(Continued)

(52) U.S. Cl.
CPC .............. *A23K 10/38* (2016.05); *A23K 30/20* (2016.05); *B01D 3/148* (2013.01); *B01D 21/262* (2013.01); *B01D 25/12* (2013.01); *C12F 3/10* (2013.01)

(58) Field of Classification Search
CPC ........ A23K 10/38; A23K 30/20; A23K 50/10; A23K 50/30; A23K 50/75; A23K 50/80;
(Continued)

(56) References Cited

U.S. PATENT DOCUMENTS

| 4,361,651 A | 11/1982 | Keim |
| 4,624,805 A | 11/1986 | Lawhon |

(Continued)

FOREIGN PATENT DOCUMENTS

| CN | 1242879 C | 2/2006 |
| EP | 0395556 A1 | 10/1990 |

(Continued)

OTHER PUBLICATIONS

European Patent Office, Extended Search Report issued in EP 22172371.1 dated Oct. 11, 2022.

(Continued)

*Primary Examiner* — Deborah D Carr
(74) *Attorney, Agent, or Firm* — Wood Herron & Evans LLP

(57) ABSTRACT

A method and system are disclosed for producing a protein and fiber feed product from a whole stillage byproduct produced in a corn dry milling process for making alcohol, such as ethanol, and/or other biofuels/biochemicals. In one embodiment, the method includes separating the whole stillage byproduct into an insoluble solids portion and a centrate (solubles) portion. Thereafter, a fine fiber and protein portion may be separated from the centrate (solubles) portion. The fine fiber and protein portion may be dewatered to provide a protein and fiber feed product. In one example, the protein and fiber feed product can include insoluble solids, such as wet or dry distiller's grains with or without solubles. The resulting protein and fiber feed product may be sold and/or used as rumen feed, swine feed, chicken feed, aqua feed, food uses, or have other uses, including pharmaceutical and/or chemical usage, for example.

28 Claims, 4 Drawing Sheets

(51) Int. Cl.
  *B01D 3/14* (2006.01)
  *B01D 21/26* (2006.01)
  *B01D 25/12* (2006.01)
  *C12F 3/10* (2006.01)

(58) Field of Classification Search
  CPC ...... B01D 3/148; B01D 21/262; B01D 25/12; C12F 3/10; Y02E 50/10; Y02P 60/87
  See application file for complete search history.

(56) References Cited

U.S. PATENT DOCUMENTS

| | | | |
|---|---|---|---|
| 5,066,498 A | 11/1991 | McCauley, III | |
| 5,177,008 A | 1/1993 | Kampen | |
| 5,250,182 A | 10/1993 | Bento et al. | |
| 5,662,810 A | 9/1997 | Willgohs | |
| 5,958,233 A | 9/1999 | Willgohs | |
| 6,071,378 A | 6/2000 | Saito | |
| 6,095,065 A | 8/2000 | Dietrich, Sr. | |
| 6,509,180 B1 | 1/2003 | Verser et al. | |
| 6,634,508 B1 | 10/2003 | Ishigaki | |
| 6,962,722 B2 | 11/2005 | Dawley et al. | |
| 7,101,691 B2 | 9/2006 | Kinley et al. | |
| 7,351,559 B2 | 4/2008 | Verser et al. | |
| 7,494,675 B2 | 2/2009 | Abbas et al. | |
| 7,601,858 B2 | 10/2009 | Cantrell et al. | |
| 7,608,729 B2 | 10/2009 | Winsness et al. | |
| 7,829,680 B1 | 11/2010 | Sander et al. | |
| 8,008,516 B2 | 8/2011 | Cantrell et al. | |
| 8,008,517 B2 | 8/2011 | Cantrell et al. | |
| 8,103,385 B2 | 1/2012 | Macharia et al. | |
| 8,168,037 B2 | 5/2012 | Winsness | |
| 8,257,951 B2 | 9/2012 | Prevost et al. | |
| 8,283,484 B2 | 10/2012 | Cantrell et al. | |
| 8,481,677 B2 | 7/2013 | Barrows et al. | |
| 8,679,353 B2 | 3/2014 | Winsness | |
| 8,679,793 B2 | 3/2014 | Lewis | |
| 8,722,911 B2 | 5/2014 | Bleyer et al. | |
| 8,778,433 B2 * | 7/2014 | Lee .................. | A23L 7/198 422/255 |
| 8,813,973 B2 | 8/2014 | Lee et al. | |
| 8,906,204 B2 | 12/2014 | Xu | |
| 8,956,460 B2 | 2/2015 | Ahmed et al. | |
| 8,986,551 B2 | 3/2015 | Kohl et al. | |
| 9,029,126 B2 | 5/2015 | Bleyer et al. | |
| 9,066,531 B2 | 6/2015 | Williams | |
| 9,644,228 B2 | 5/2017 | Barrows et al. | |
| 10,160,932 B2 | 12/2018 | Lee | |
| 10,233,404 B2 | 3/2019 | Lee | |
| 10,266,790 B2 | 4/2019 | Lee | |
| 10,519,398 B1 | 12/2019 | Lee | |
| 2003/0180415 A1 | 9/2003 | Stiefel et al. | |
| 2004/0082044 A1 | 4/2004 | Prevost et al. | |
| 2004/0087808 A1 | 5/2004 | Prevost et al. | |
| 2006/0006116 A1 | 1/2006 | Scheimann et al. | |
| 2006/0041153 A1 | 2/2006 | Cantrell et al. | |
| 2006/0057251 A1 | 3/2006 | Dawley et al. | |
| 2006/0071378 A1 | 4/2006 | Brown | |
| 2006/0091050 A1 | 5/2006 | Hwang | |
| 2006/0173169 A1 | 8/2006 | Cheryan | |
| 2006/0194296 A1 | 8/2006 | Hammond et al. | |
| 2007/0039853 A1 | 2/2007 | Angulo Aramburu | |
| 2007/0254089 A1 | 11/2007 | Hickey et al. | |
| 2008/0026101 A1 | 1/2008 | Nickel et al. | |
| 2008/0044547 A1 | 2/2008 | DeLine et al. | |
| 2008/0095890 A1 | 4/2008 | Watson | |
| 2008/0110577 A1 | 5/2008 | Winsness | |
| 2008/0299632 A1 | 12/2008 | Winsness et al. | |
| 2009/0029432 A1 | 1/2009 | Abbas et al. | |
| 2009/0130257 A1 | 5/2009 | Abbas et al. | |
| 2009/0250412 A1 | 10/2009 | Winsness et al. | |
| 2009/0259060 A1 | 10/2009 | Cantrell et al. | |
| 2010/0004474 A1 | 1/2010 | Cantrell et al. | |
| 2010/0260918 A1 | 10/2010 | Wang et al. | |
| 2012/0121565 A1 | 5/2012 | Williams | |
| 2012/0205324 A1 | 8/2012 | Cantrell et al. | |
| 2012/0312905 A1 | 12/2012 | Claycamp | |
| 2013/0164795 A1 | 6/2013 | Lowe et al. | |
| 2014/0053829 A1 | 2/2014 | Lee | |
| 2014/0142282 A1 | 5/2014 | Emanuele et al. | |
| 2014/0147897 A1 | 5/2014 | Lee | |
| 2014/0212543 A1 | 7/2014 | Ywood et al. | |
| 2014/0220650 A1 | 8/2014 | Woods et al. | |
| 2014/0242251 A1 | 8/2014 | Bootsma | |
| 2014/0319066 A1 | 10/2014 | LoCascio et al. | |
| 2014/0343259 A1 | 11/2014 | Bleyer et al. | |
| 2015/0010975 A1 | 1/2015 | Burlew et al. | |
| 2015/0056327 A1 | 2/2015 | Redford | |
| 2015/0060259 A1 | 3/2015 | Xu | |
| 2015/0064308 A1 | 3/2015 | Williams | |
| 2015/0068058 A1 | 3/2015 | Buettner et al. | |
| 2015/0080203 A1 | 3/2015 | Martyniuk | |

FOREIGN PATENT DOCUMENTS

| | | |
|---|---|---|
| EP | 0636692 A1 | 2/1995 |
| EP | 1988169 A1 | 11/2008 |
| WO | 8606098 A1 | 10/1986 |
| WO | 2010109203 A1 | 9/2010 |
| WO | 201414683 A1 | 1/2014 |
| WO | 201426947 A1 | 2/2014 |
| WO | 201433476 A2 | 3/2014 |

OTHER PUBLICATIONS

Zhang et al., "DDGS Production Technology, Research and Utilization Satus and Application in Livestock and Poultry Production," Animals Breeding and Feed, Issue 10, pp. 38-42.

* cited by examiner

METHOD AND SYSTEM FOR PRODUCING A PROTEIN AND FIBER FEED PRODUCT FROM A WHOLE STILLAGE BYPRODUCT PRODUCED IN A CORN DRY MILLING PROCESS

TECHNICAL FIELD

The present invention relates generally to corn dry milling, and more specifically, to a method and system for producing a protein and fiber feed product from a whole stillage byproduct produced in a corn (or similar carbohydrate-containing grain) dry milling process for making alcohol, such as ethanol, and/or other biofuels/biochemicals.

BACKGROUND

Wet mill corn processing plants convert corn grain into several different natural co-products, such as germ (for oil extraction), gluten feed (high fiber animal feed), gluten meal (high protein animal feed), and starch-based products, including ethanol, high fructose corn syrup, or food and industrial starch. However, constructing wet-milling plants is complex and capital-intensive, and operating them is operationally complex and energy intensive.

Dry-mill ethanol plants alternatively have a much lower capital cost to build and lower operating cost to operate. Dry milling plants generally convert corn into only three products, i.e., ethanol, distiller's corn oil, and distiller's grains with solubles. A typical corn dry milling process consists of four major steps: grain handling and milling, liquefaction and saccharification, fermentation and distillation, and co-product recovery. Grain handling and milling is the step in which the corn is brought into the plant and ground to promote better starch to glucose conversion. Liquefaction is the step of converting solids such as starch to a flowable liquid producing oligosaccharides and saccharification is where the oligosaccharides are converted into single glucose molecules. Fermentation and distillation is the process of yeast or bacteria, or as clostridia, for example, converting glucose into a biofuel or a biochemical, such as ethanol. Co-product recovery is the step in which the corn by-products are de-watered and made ready. There are many known chemical and biological conversion processes known in the art that utilize yeast, bacteria, or the like to convert glucose to other biofuels and biochemical components like ethanol, for example.

The recovery of alcohol, e.g., butanol, ethanol (a natural co-product), etc., and other similar compounds, generally begins with the beer being sent to a distillation system. With distillation, ethanol is typically separated from the rest of the beer through a set of stepwise vaporizations and condensations. The beer less the alcohol extracted through distillation is known as whole stillage, which contains a slurry of the spent grains including corn protein, fiber, oil, minerals, and sugars. This byproducts is too diluted to be of much value at this point and is further processed to provide the distiller's grains with soluble.

In typical processing, when the whole stillage leaves the distillation column, it is generally subjected to a decanter centrifuge to separate insoluble solids or "wet cake", which includes fiber, from the liquid or "thin stillage", which includes, e.g., protein, fine fiber, oil, and amino acids. After separation, the thin stillage moves to evaporators to boil away moisture, leaving a thick syrup that contains soluble (dissolved) solids. The concentrated syrup is typically mixed with the wet cake, and the mixture may be sold to beef and dairy feedlots as distillers wet grain with solubles (DWGS). Alternatively, the wet cake and concentrated syrup mixture may be dried in a drying process and sold as distillers dried grain with solubles (DDGS). The resulting DDGS generally has a crude protein content of about 29% and is a useful feed for cattle and other ruminants due to its protein and fiber content. The resulting product is a natural product.

While DDGS and DWGS provide a critical secondary revenue stream that offsets a portion of the overall ethanol production cost, it would be beneficial to provide a method and system where a backend stream(s) in the corn dry milling process can be utilized to recover one or more other products that can provide other or additional revenue sources.

SUMMARY

The present invention relates generally to corn dry milling, and more specifically, to a method and system for producing a protein and fiber feed product from a whole stillage byproduct produced in a corn (or similar carbohydrate-containing grain) dry milling process for making alcohol, such as ethanol, and/or other biofuels/biochemicals.

In one embodiment, a method for producing a protein and fiber feed product from a whole stillage byproduct produced in a starch containing grain dry milling process for making biofuel and/or a biochemical is disclosed that includes separating the whole stillage byproduct into an insoluble solids portion and a solubles portion, including fine fiber and protein and then filtering out the fine fiber and protein from the separated solubles portion to define a fine fiber and protein portion. Next, the fine fiber and protein portion is dewatered to produce a dewatered protein and fiber feed product and then the dewatered protein and fiber feed product is recovered. In one example, the resulting protein and fiber feed product can include distiller's grains (wet or dry) with or without solubles to define a DWG(S) or DDG(S) protein and fiber feed product.

In another embodiment, a system for producing a protein and fiber feed product from a whole stillage byproduct produced in a starch containing grain dry milling process for making biofuel and/or a biochemical is disclosed that includes a first apparatus that receives the whole stillage byproduct and separates the whole stillage byproduct into an insoluble solids portion and a solubles portion, including fine fiber and protein, and second apparatus that is situated after the first apparatus and that receives the solubles portion, the second apparatus filters out the fine fiber and protein from the separated solubles portion to define a fine fiber and protein portion. The system further includes a dewatering device that is situated after the second apparatus and that receives the fine fiber and protein portion, the dewatering device dewaters the fine fiber and protein portion to produce a dewatered protein and fiber feed product.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

The present invention is directed to a method and system for producing a protein and fiber feed product from a whole stillage byproduct produced in a corn dry milling process for making a biofuel, e.g., ethanol, or a biochemical, e.g., lactic acid. In one example, the protein and fiber feed product can include insoluble solids, such as wet or dry distiller's grains with or without solubles.

Figure 1:
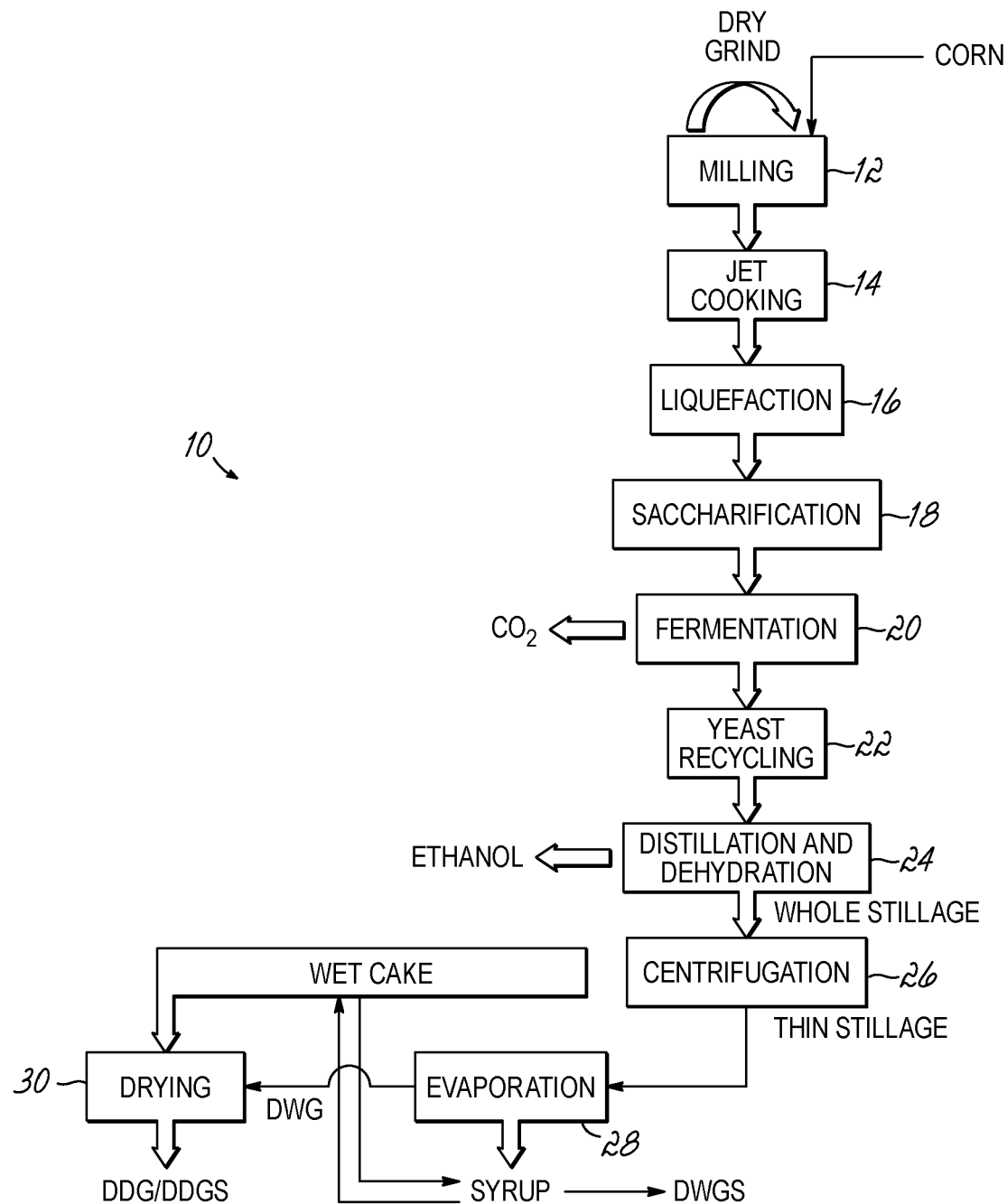
FIG. 1 is a flow diagram of a prior art dry milling process and system for producing ethanol and distiller's grains with solubles.

FIG. 1 is a flow diagram of a prior art corn dry milling process for producing alcohol, such process is fully discussed in U.S. Pat. No. 8,778,433, entitled "Methods for producing a high protein corn meal from a whole stillage byproduct". A significant portion of alcohol, e.g., ethanol, in the United States is produced from dry milling processes, which convert corn into two products, namely ethanol and distiller's grains with solubles. Although virtually any type and quality of grain, such as but not limited to sorghum, wheat, triticale, barley, rye, tapioca, cassava, potato, and other starch containing grains can be used to produce ethanol, the feedstock for this process is typically corn referred to as "No. 2 Yellow Dent Corn."

With specific reference to FIG. 1, a typical corn dry milling process 10 begins with a milling step 12 in which dried whole corn kernels are passed through hammer mills to grind them into meal or a fine powder. The ground meal is mixed with water to create a slurry, and a commercial enzyme such as alpha-amylase is added. This slurry is then typically heated in a cooking process 14, which can optionally include a jet cooker process, to solubilize the starch in the ground meal. This is followed by a liquefaction step 16 at which point additional alpha-amylase may be added. The alpha-amylase hydrolyzes the gelatinized starch into maltodextrins and oligosaccharides to produce a liquefied mash or slurry.

This can be followed by separate saccharification and fermentation steps, 18 and 20, respectively, although in most commercial dry milling ethanol processes, saccharification and fermentation occur simultaneously. In the saccharification step 18, the liquefied mash is cooled and a commercial enzyme, such as gluco-amylase, as well as a cellulase or similar fiber acting enzymes, can be added to hydrolyze the maltodextrins and short-chained oligosaccharides into single sugar type molecules. In the fermentation step 20, a common strain of yeast (Saccharomyces cerevisae) is added to metabolize the glucose sugars into ethanol and $CO_2$. Upon completion, the fermentation mash ("beer") will contain about 17% to 18% ethanol (volume/volume basis), plus soluble and insoluble solids from all the remaining grain components, including fiber, protein, minerals, and oil, for example. Yeast can optionally be recycled in a yeast recycling step 22. In some instances, the $CO_2$ is recovered and sold as a commodity product.

Subsequent to the fermentation step 20 is a distillation and dehydration step 24 in which the beer is pumped into distillation columns where it is boiled to vaporize the ethanol. The ethanol vapor after exiting the top of the distillation column is condensed and liquid alcohol (in this instance, ethanol) is about 95% purity (190 proof). The 190 proof ethanol can then go through a molecular sieve dehydration column or a membrane separation unit or similar dehydration system, which removes the remaining residual water from the ethanol, to yield a final product of essentially 100% ethanol (199.5 proof).

Finally, a centrifugation step 26 involves centrifuging, via a decanter centrifuge, the residuals or whole stillage leftover from distillation so as to separate the insoluble solids portion or "wet cake", which includes fiber, germ particles, and larger solids from the liquid portion or "thin stillage" portion, which includes fine solids, soluble solids, protein, amino acids, oil, etc. Next, the thin stillage portion enters evaporators in an evaporation step 28 in order to boil away moisture thereby leaving a thick syrup, which contains the soluble (dissolved) solids as well as fine protein and oil. This concentrated syrup is typically referred to as corn condensed distillers soluble and is mixed with the centrifuged wet cake then sold to beef and dairy feedlots as distillers wet grain with solubles (DWGS). The syrup also typically is further processed to separate out free oil from the concentrated syrup via a centrifuge or the like. The wet cake and concentrated syrup mixture may be further dried in a drying step 30 and sold as distillers dried grain with solubles (DDGS) to dairy and beef feedlots and/or the monogastric markets. The distiller's grains with solubles co-product provides a critical secondary revenue stream that offsets a portion of the overall ethanol production cost.

Figure 2A:
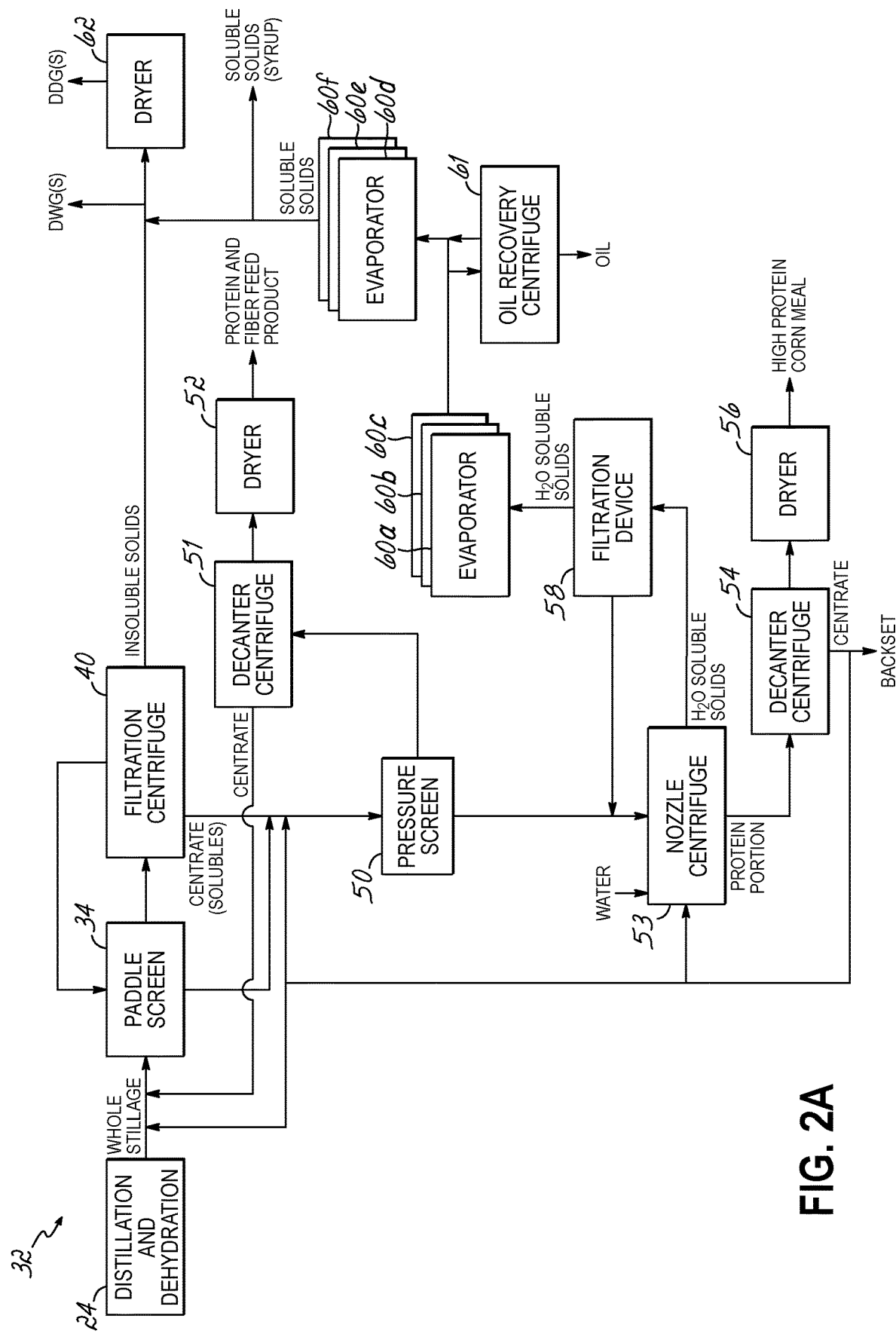
FIG. 2A is a flow diagram of a method and system for producing a protein and fiber feed product from a whole stillage byproduct produced via a corn dry milling process for making alcohol (e.g., ethanol) in accordance with an embodiment of the invention.
Figure 2B:
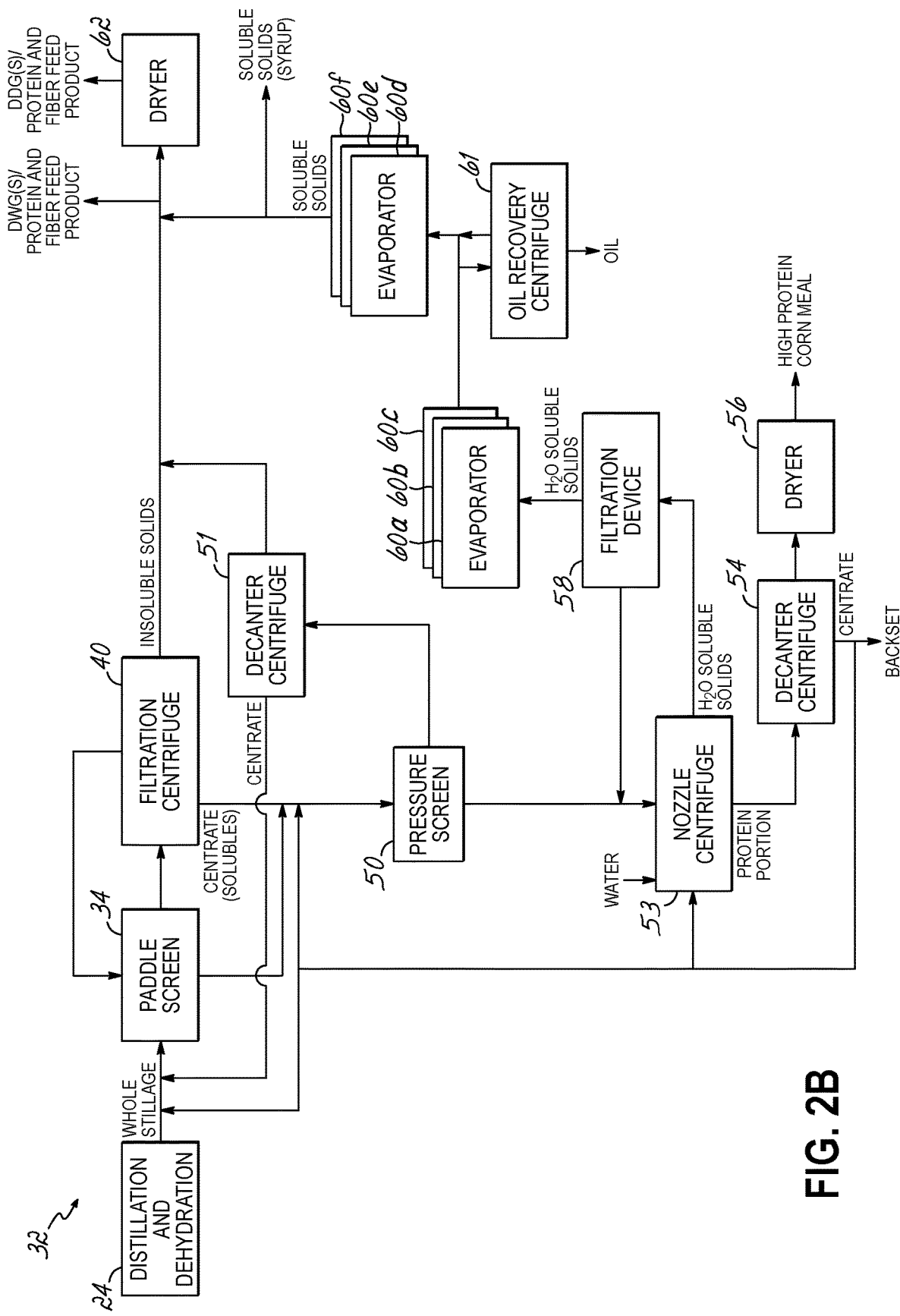
FIG. 2B is a flow diagram of a method and system for producing a protein and fiber feed product from a whole stillage byproduct produced via a corn dry milling process for making alcohol (e.g., ethanol) in accordance with another embodiment of the invention.
Figure 2C:
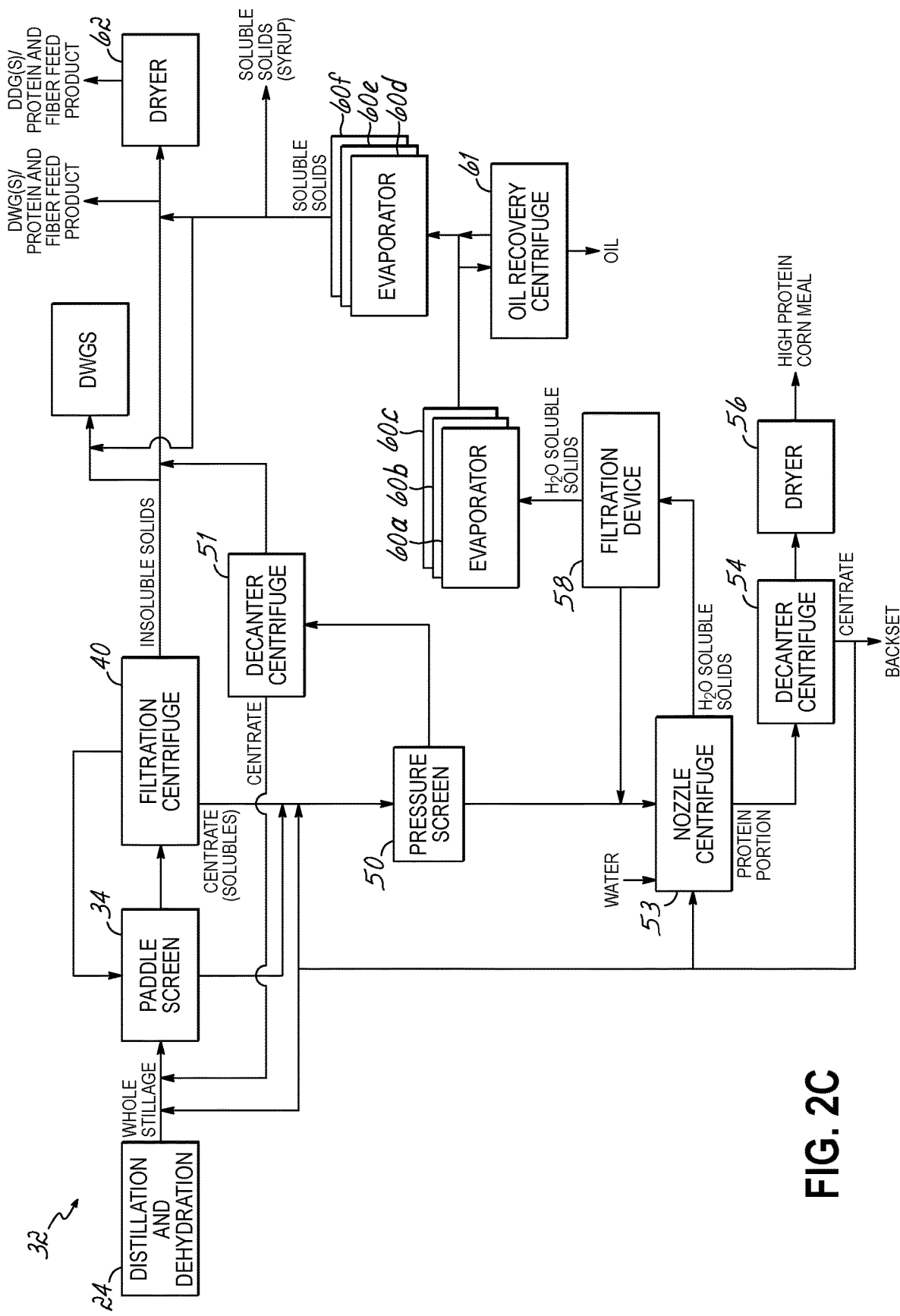
FIG. 2C is a flow diagram of a method and system for producing a protein and fiber feed product from a whole stillage byproduct produced via a corn dry milling process for making alcohol (e.g., ethanol) in accordance with another embodiment of the invention.

In accordance with the present invention, FIGS. 2A-2C schematically illustrate embodiments of a method and system, collectively numeral 32, for producing a protein and fiber feed product, which can include distiller's grains (wet or dry) with or without solubles (FIGS. 2B and 2C), from the whole stillage byproduct produced in a typical corn dry milling process 10, like that just described in FIG. 1. While a typical whole stillage byproduct is utilized here, it should be understood that the whole stillage from any corn or similar or other grain dry milling process may be utilized with the same or similar results. Again, the whole stillage byproduct contains a slurry of soluble and insoluble solids, i.e., the spent yeast and spent grains from the distillation and dehydration step 24, which can include amino acids, protein, fiber, and oil, for example, that can be processed in accordance with embodiments of this invention to produce a high protein feed product as well as a high protein and fiber feed product. The protein and fiber feed product may be further processed to be sold and/or used as or in, for example, swine, ruminant, fish, or chicken feed.

With reference to FIG. 2A, the whole stillage byproduct can be piped from the typical corn dry milling distillation and dehydration step 24 and subjected to an optional paddle screen 34. The optional paddle screen 34 or other like equipment, as discussed below, can be situated before a filtration centrifuge 40, which also is further discussed below, so as to aid ultimately in separation of the insoluble solids portion, e.g., fiber, from the centrate (solubles) portion by initially filtering out desirable amounts of water, amino acids, protein, oil, and, incidentally, small fiber fines from the whole stillage byproduct. This initial screening can help reduce the resulting load on the subsequent filtration centrifuge 40. The resulting throughs (centrate) from the paddle screen 34 eventually joins with the centrate (solubles) underflow from the filtration centrifuge 40, as will be discussed in greater detail below.

To filter the whole stillage byproduct, the optional paddle screen 34 (or like equipment) can include screen openings of no greater than about 400 microns. In another example, the paddle screen 34 can include openings therein of no greater than about 250 microns. In yet another example, the openings therein are no greater than about 150 microns. In yet another example, the openings therein are no greater than about 100 microns. In yet another example, the openings therein are no greater than about 75 microns. It should be understood that these values are exemplary and that those of ordinary skill in the art will recognize how to determine the size of the openings to achieve the desired separation. In one example, the optional paddle screen 34 is a standard type paddle screen as is known in the art. One such suitable paddle screen 34 is the FQ-PS32 available from Fluid-Quip, Inc. of Springfield, Ohio. It should be understood that the optional paddle screen 34 may be replaced with other types of filtration/separation or pre-concentration devices, e.g., a standard pressure screen, conic centrifuge, cyclone, filter press, rotary filter, or hydroclone, which can perform the desired filtration or preconcentration function. One such suitable pressure screen is the PS-Triple available from Fluid-Quip, Inc. of Springfield, Ohio. In addition, although a single paddle screen 34 is depicted, it should be understood that a plurality of paddle screens 34 may be situated in-line, either in series or in parallel, and utilized for filtering the whole stillage byproduct.

The whole stillage from the distillation and dehydration step 24, if the optional paddle screen 34 (or like equipment) is not present, or the cake (solids) from the optional paddle screen 34 is sent to the filtration centrifuge 40 whereat the whole stillage byproduct or overflow is separated into the insoluble solids portion, which includes fiber, and the centrate (solubles) portion, which includes amino acids, protein, oil, etc. One such suitable filtration centrifuge is described in Lee et al., U.S. Pat. No. 8,813,973 entitled "Apparatus and Method for Filtering a Material from a Liquid Medium", the contents of which are expressly incorporated by reference herein in its entirety. The filtration centrifuge 40 may be configured to perform both the initial filtering (sometimes referred to as a pre-concentration) of the whole stillage byproduct and washing of the fiber so as to clean the fiber and remove the protein, amino acids, oil, and other components that remain associated with the fiber after the initial filtration or pre-concentration.

With respect to the filtration centrifuge 40, the washing of the fiber may include a washing cycle, wherein the fiber is mixed and rinsed in wash water, followed by a de-watering cycle, wherein the wash water is separated from the fiber. The washing of the fiber may include multiple rinsing/de-watering cycles (in series or parallel). Additionally, a counter current washing technique may be employed to save wash water usage. After washing the fiber, but before the fiber exits the centrifuge, the fiber may go through an enhanced de-watering stage, a compaction stage, and/or an air drying stage to further de-water or dry the fiber. This may increase the dryer capacity or eliminate the dryer altogether. Eventually, the washed and filtered fiber exits the filtration centrifuge 40 so that the fiber can be further processed, as discussed further below to result in a desired product, such as DWG(S) or DDG(S). In one example, the fiber can be transported to a remote site for further processing, such as anaerobic or aerobic digestion, conversion to C5 and C6 sugar molecules for biofuel, or biochemical conversion or food production processes. Moreover, any separated out portion of slurry from the fiber, e.g., protein, free oil, amino acids (including sulfur containing amino acids), water/wash water, etc., which occurs via screening, is collected to define the centrate (solubles) stream, then transported and further processed as described below. Optionally, a portion of the slurry and/or wash water may be piped back to the optional paddle screen 34 for further reprocessing. The filtration centrifuge 40 may provide the filtered material at a water concentration of between about 55% and about 85% water, which is a significant reduction compared to conventional filtration systems.

With continuing reference to FIG. 2A, although a single filtration centrifuge 40 is depicted, it should be understood that a plurality of filtration centrifuges 40, either in parallel or series, may be situated in-line and utilized for separating the whole stillage byproduct into its insoluble solids portion (fiber) and centrate (solubles) portion. In an alternate embodiment, it is contemplated that the filtration centrifuge 40 can be replaced by a standard pressure screen, decanter centrifuge, paddle screen, desludging device, dewatering press, or other like devices as are known in the art to separate the whole stillage byproduct into the insoluble solids portion and centrate (solubles) portion. One such suitable pressure screen is the PS-Triple available from Fluid-Quip, Inc. of Springfield, Ohio. One such suitable decanter centrifuge is the NX-944HS available from Alfa Laval of Lund, Sweden. And one such suitable paddle screen is the FQ-PS32 available from Fluid-Quip, Inc. of Springfield, Ohio.

As further shown in FIG. 2A, the centrate (solubles) underflow from the filtration centrifuge 40 is piped to join up with the centrate from the optional paddle screen 34 prior to or at a standard pressure screen 50, as is known in the art, to further aid in separation of any fine fiber from the centrate (solubles) portion. If the optional paddle screen 34 is not present, the centrate (solubles) underflow from the filtration centrifuge 40 is sent directly to pressure screen 50. Prior to being subjected to the pressure screen 50, the protein content within this stream ranges from 17% to 34% and solids content within this stream ranges from 5% to 15%.

Fine fiber having a particle size less than that of the screen of the filtration centrifuge 40 and/or optional paddle screen 34 may pass through and to subsequent steps of the corn dry-milling process. At the pressure screen 50, the fine fiber and protein can be separated from the centrate (solubles), which results in a separated fine fiber and protein portion. To separate the fine fiber and protein, in one example, the pressure screen can include screen openings of no greater than about 500 microns. In another example, the pressure screen can include openings therein no greater than about 400. In another example, the pressure screen can include openings therein no greater than about 250. In another example, the pressure screen can include openings therein no greater than about 150 microns. In yet another example, the pressure screen can include openings therein of no greater than about 75 microns. One such suitable pressure screen 50 is the PS-Triple available from Fluid-Quip, Inc. of Springfield, Ohio. In an alternate embodiment, the pressure screen 50 may be replaced with a standard paddle screen or decanter centrifuge, as are mentioned above, or other like device or particle size separation operation, to aid in separation of the fine fiber from the centrate (solubles) portion. In addition, although a single pressure screen 50 is depicted, it should be understood that a plurality of pressure screens

50, either in parallel or series, may be situated in-line and utilized for filtering the centrate (solubles) underflow.

The separated fine fiber and protein portion from the pressure screen 50 can then be piped and subjected to a dewatering device, such as decanter centrifuge 51. At the decanter centrifuge 51, the fine fiber and protein portion is dewatered to provide a protein and fiber feed product. The dewatered protein and fiber feed product can be further optionally dried, such as by being sent to a dryer 52, e.g., a spray dryer, a ring dryer, or a crystallizer, as is known in the art. In another embodiment, the dewatered protein and fiber feed product can be subjected to vacuum filtration or other drying methods, as are known in the art. The final, dewatered protein and fiber feed product defines a feed product that includes, for example, at least 15 wt % protein on a dry basis and which may be sold as or used in rumen feed, swine feed, chicken feed, aqua feed, food uses, or have other uses, including biofuels, pharmaceutical and/or chemical usage such as for synthetic vanilla, for example. In another embodiment, the protein and fiber feed product includes at least 25 wt % protein on a dry basis. In another embodiment, the feed product includes at least 28 wt % protein on a dry basis. In still another embodiment, the feed product includes at least 30 wt % protein on a dry basis. In yet another embodiment, the feed product includes at least 32 wt % protein on a dry basis. In another embodiment, the feed product includes at least 20 wt % fiber on a dry basis. In another embodiment, the feed product includes at least 30 wt % fiber on a dry basis. In another embodiment, the feed product includes at least 35 wt % fiber on a dry basis. In another embodiment, the feed product includes at least 40 wt % fiber on a dry basis. It should be understood that the type and concentration of the protein and/or fiber present in the final protein and fiber feed product here may vary based on the carbohydrate-containing grain source, the fermentation process, and/or the specific application. The resulting protein and fiber feed product may be sold at a much higher price per ton than DDG(S) or DWG(S).

The decanter centrifuge 51 is standard and known in the art. One such suitable decanter centrifuge 51 is the NX-944HS available from Alfa Laval of Lund, Sweden. In addition, although a single decanter centrifuge 51 is depicted, it should be understood that a plurality of decanter centrifuges 51 may be situated in-line, either in series or parallel, and utilized for dewatering the fine fiber and protein portion. In an alternate embodiment, the decanter centrifuge 51 may be replaced with a filter press or rotary vacuum, or other like device, as are known in the art, to dewater the fine fiber and protein portion. To dewater the fine fiber and protein portion, a dewatering device can include screen openings of greater than about 100 microns to 1500 microns. In another example, the dewatering device can include openings therein from about 100 to 1000 microns. In another example, the dewatering device can include openings therein from about 100 to 500 microns. In another example, the dewatering device can include openings therein of no greater than about 1500 microns. In yet another example, the openings therein are no greater than about 1000 microns. It should be understood that these values are exemplary and that those of ordinary skill in the art will recognize how to determine the size of the openings to achieve the desired separation. A water portion or centrate from the decanter centrifuge 51 may be recycled back, for example, to liquefaction step 16, fermentation step 20, or the optional paddle screen 34 (as shown) for reuse in the dry-milling process.

Returning now to the pressure screen 50, the remaining centrate (solubles) portion from the pressure screen 50 is piped and subjected to a nozzle centrifuge 53, as is known in the art. The nozzle centrifuge 53 can be provided with washing capabilities so that water, or similar aqueous solutions or low solid centrate streams, along with the centrate (solubles) portion, can be supplied to the nozzle centrifuge 53. The additional water allows for easier separation of the centrate (solubles) into a remaining protein portion and a water soluble solids portion. The heavier protein portion separates from the water soluble solids portion and is removed as the underflow whereas the lighter water soluble solids portion, which includes oil, can be removed as the overflow. An optional additional centrate portion from decanter centrifuge 54, as discussed below, also may be provided to the nozzle centrifuge 53 here. One such suitable nozzle centrifuge 53 is the FQC-950 available from Fluid-Quip, Inc. of Springfield, Ohio. In an alternate embodiment, the nozzle centrifuge 53 can be replaced with a standard cyclone apparatus or other like device, as are known in the art, to separate the centrate (solubles) portion into the underflow protein portion and overflow water soluble solids portion. One such suitable cyclone apparatus is the RM-12-688 available from Fluid-Quip, Inc. of Springfield, Ohio.

The resulting protein portion from the nozzle centrifuge 53 can then be piped and subjected to a decanter centrifuge 54. At the decanter centrifuge 54, the protein portion is dewatered to provide a dewatered protein portion. The decanter centrifuge 54 is standard and known in the art. One such suitable decanter centrifuge 54 is the SG806 available from Alfa Laval of Lund, Sweden. In addition, although a single decanter centrifuge 54 is depicted, it should be understood that a plurality of decanter centrifuges 54 may be situated in-line, either in series or parallel, and utilized for filtering the centrate (solubles) underflow. In an alternate embodiment, the decanter centrifuge 54 may be replaced with a standard filter press or rotary vacuum, or other like device, as are known in the art, to dewater the centrate (solubles) portion. A water portion or filtrate from the decanter centrifuge 54 may be recycled back, for example, as backset to the liquefaction step 16 or the fermentation step 20 for reuse in the dry-milling process. In another example, the centrate from the decanter centrifuge 54 may be recycled back to one or more of the optional paddle screen 34, optional pressure screen 50, and the nozzle centrifuge 53, such as for use as wash water.

The dewatered protein portion from the decanter centrifuge 54 can be further optionally dried, such as by being sent to a dryer 56, e.g., a rotary dryer, spray dryer, a ring dryer, a crystallizer, or an air classifier, as is known in the art. In another embodiment, the dewatered protein portion can be subjected to vacuum filtration or other drying methods, or other downstream processes prior to or after being dried, as are known in the art. The final dried protein product defines a high protein corn meal that includes, for example, at least 40 wt % protein on a dry basis and which may be sold as swine feed, chicken feed, aqua feed, food uses, or have other uses, including pharmaceutical and/or chemical usage, for example. In another embodiment, the high protein corn meal includes at least 45 wt % protein on a dry basis. In another embodiment, the high protein corn meal includes at least 50 wt % protein on a dry basis. In yet another embodiment, the high protein corn meal includes at least 60 wt % protein on a dry basis. In still another embodiment, the high protein corn meal includes about 56 wt % protein on a dry basis. It should be understood that the type and concentration of the protein present in the final product may vary based on the carbohydrate-containing grain source, the fermentation process, and/or the specific application. The resulting high protein corn meal may be sold at a much higher price per ton than DDGS or DWGS.

Returning now to the separated water soluble solids portion or filtrate from the filtration step 53, which includes oil as well as minerals and soluble proteins, the separated water soluble solids portion may be recycled back, for example, to the liquefaction step 16 or the fermentation step 20 for reuse in the dry-milling process. Additionally or alternatively, as shown in FIG. 2A, the water soluble solids portion can be piped from the filtration step 53 and subjected to further processing via an optional filtration device 58, such as a filter press, membrane filtration (e.g., microfiltration, ultrafiltration, and the like), rotary filter, or the like, to further separate out additional insoluble components such as residual protein (retentate) and the like from the water soluble solids portion. The retentate can be sent or recycled back to the nozzle centrifuge 53 and/or to other prior locations. The filtered water soluble solids portion (filtrate) may be recycled back, for example, to the liquefaction step 16 or the fermentation step 20 for reuse in the dry-milling process. Additionally or alternatively, with continuing reference to FIG. 2A, the optionally filtered water soluble solids portion can be piped from the filtration step 58 or, if the optional filtration step 58 is not utilized, the water soluble solids portion can be piped from the filtration step 53 and subjected to a set of three evaporators 60a, 60b, and 60c, as are known in the art, to begin separating the soluble solids from the water soluble solids portion. The evaporators 60a-c evaporate the liquid portion of the water soluble solids portion. Thereafter, all or a portion of the water soluble solids portion can be piped and subjected to an optional oil recovery centrifuge 61, as is known in the art, so that oil can be removed therefrom. One such suitable oil recovery centrifuge 61 is the ORPX 617 available from Alfa Laval of Lund, Sweden. In one example, the final recovered oil product can include between about 30 wt % to about 60 wt % of the total corn oil in the corn. In comparison to typical oil recovery in a standard dry-milling process, oil recovery centrifuge 61 can function at a higher capacity because the water soluble solids portion, which is subjected to the oil recovery centrifuge 61, includes less liquid and less protein and fiber than normal.

The water soluble solids portion from evaporators 60a-c or the remainder of the water soluble solids portion from the evaporators 60a-c and/or from the optional oil recovery centrifuge 61 can be piped and subjected to another set of three evaporators 60d, 60e, and 60f whereat the liquid portion is further evaporated from the water soluble solids portion to ultimately yield a soluble solids portion (or syrup). While the water soluble solids portion is subjected to two sets of three evaporators 60a-c, 60d-f, it should be understood that the number of evaporators and sets thereof can be varied, i.e., can be more or less, from that shown depending on the particular application and result desired.

The resulting soluble solids portion may be combined with the insoluble solids portion, e.g., fiber, received from the filtration centrifuge 40 to provide distillers wet grains with soluble (DWGS), which may be further dried by a drier 62, as is known in the art, to provide distillers dry grains with solubles (DDGS), both of which can be sold to dairy and beef feedlots.

In another example, the soluble solids portion (syrup) may be directly recovered and used as a natural fertilizer or as a feed source for an aerobic or and anaerobic digestion process. In another example, the soluble solids portion may be directly recovered for use as a raw material feed source for conversion to simple sugar, which than can be further converted to biofuel or used in other biochemical processes, for example. Additionally, the soluble solids stream can be directly recovered and further processed as a raw material feed source, such as for a bio-digester to produce biofuels and/or biochemicals, an algae feed source, and/or further processed via fermentation, for example, to yield a high protein nutrient feed. Accordingly, in such a dry-milling process, neither the DDG nor DWG would receive the typical concentrated syrup from the evaporators 60. Yet, despite the potential lower protein content, the DDG and DWG may still be sold to beef and dairy feedlots as cattle feed or other animal feed markets.

In another embodiment of the invention, as shown in FIG. 2B, the dewatered fine fiber and protein portion from the decanter centrifuge 51 can be directly combined with the insoluble solids portion from the filtration centrifuge 40 to provide a DWG(S) protein and fiber feed product having a greater concentration of fiber and protein than that of FIG. 2A, which may be further dried by drier 62 to provide a distillers dry grains optionally with solubles (DDGS) again having a greater concentration of fiber and protein than that of FIG. 2A, both of which can be sold to dairy and beef feedlots. Here, the final DDG(S) protein and fiber feed product can include, for example, at least 15 wt % protein on a dry basis. In another embodiment, the DDG(S) protein and fiber feed product includes at least 20 wt % protein on a dry basis. In another embodiment, the DDG(S) protein and fiber feed product includes at least 25 wt % protein on a dry basis. In yet another embodiment, the DDG(S) protein and fiber feed product includes at least 30 wt % protein on a dry basis. In another embodiment, the feed product includes at least 20 wt % fiber on a dry basis. In another embodiment, the feed product includes at least 30 wt % fiber on a dry basis. In another embodiment, the feed product includes at least 35 wt % fiber on a dry basis. In another embodiment, the feed product includes at least 40 wt % fiber on a dry basis. It should be understood that the type and concentration of the protein present in the final DDG(S) protein and fiber feed product here may vary based on the carbohydrate-containing grain source, the fermentation process, and/or the specific application.

In yet another embodiment, as shown in FIG. 2C, the dewatered fine fiber and protein portion from the decanter centrifuge 51 can be directly combined with the insoluble solids portion from the filtration centrifuge 40, like in FIG. 2B, to optionally provide a distillers wet grains with soluble (DWG(S)) protein and fiber feed product having a greater concentration of fiber and protein than that of FIG. 2A, which may be further dried by drier 62 to optionally provide a distillers dry grains with solubles (DDG(S)) again having a greater concentration of fiber and protein than that of FIG. 2A, both of which can be sold to dairy and beef feedlots as well as other animal species. But here, in FIG. 2C, a portion of the insoluble solids portion also may be removed prior to the insoluble solids portion combining with the fine fiber and protein portion, with the removed insoluble solids portion being combined with all or a portion of the soluble solids from the evaporators 60d-f to provide DWGS, which may be further optionally dried to provide DDGS, both of which can be sold to dairy and beef feedlots. If all of the soluble solids portion from the evaporators 60d-f are combined with the removed insoluble solids portion, it is understood that the DWGS or the DDGS then would exclude the solubles and thus, provide, a DWG protein and fiber feed product or DDG protein and fiber feed product.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. Thus, the invention in its broader aspects is therefore not limited to the specific details, representative apparatus and method, and illustrative example shown and described. Accordingly, departures may be made from such details without departing from the scope of applicant's general inventive concept.

What is claimed is:

1. A method for producing a protein and fiber feed product from a whole stillage byproduct produced in a starch containing grain dry milling process for making biofuel and/or a biochemical, the method comprising:
    separating the whole stillage byproduct into an insoluble solids portion and a solubles portion, including fine fiber and protein;
    filtering out the fine fiber and protein from the separated solubles portion, via a screen with openings, to define a fine fiber and protein portion;
    separately dewatering only the fine fiber and protein portion to produce a dewatered protein and fiber feed product; and
    recovering the dewatered protein and fiber feed product.

2. The method of claim 1 further comprising, after dewatering the fine fiber and protein portion to produce a dewatered protein and fiber feed product, drying the dewatered protein and fiber feed product.

3. The method of claim 1 wherein dewatering the fine fiber and protein portion to produce a dewatered protein and fiber feed product comprises dewatering the fine fiber and protein portion via a decanter centrifuge, filter press, or rotary vacuum to produce a dewatered protein and fiber feed product.

4. The method of claim 1 wherein filtering out the fine fiber and protein from the separated solubles portion to define a fine fiber and protein portion comprises filtering out the fine fiber and protein from the separated solubles portion via a pressure screen or paddle screen to define the fine fiber and protein portion.

5. The method of claim 1 wherein dewatering the fine fiber and protein portion to produce a dewatered protein and fiber feed product comprises dewatering the fine fiber and protein portion to produce the dewatered protein and fiber feed product and a filtrate, and further comprising recycling back at least a portion of the filtrate to an earlier step in the method.

6. The method of claim 1 wherein separating the whole stillage byproduct into a solubles portion, including fine fiber and protein, and an insoluble solids portion comprises separating the whole stillage byproduct into the solubles portion, including fine fiber and protein, and the insoluble solids portion via a filtration centrifuge, pressure screen, decanter centrifuge, paddle screen, desludging device, or dewatering press.

7. The method of claim 1 wherein filtering out the fine fiber and protein from the separated solubles portion to define a fine fiber and protein portion comprises filtering out the fine fiber and protein from the separated solubles portion via screen openings of no greater than about 500 microns to define the fine fiber and protein portion.

8. The method of claim 1 wherein the protein and fiber feed product includes at least 15 wt % protein on a dry basis.

9. The method of claim 1 wherein the protein and fiber feed product includes at least 32 wt % protein on a dry basis.

10. The method of claim 1 further comprising combining the dewatered protein and fiber feed product with the insoluble solids portion.

11. The method of claim 10 further comprising drying the combined protein and fiber feed product and insoluble solids portion.

12. The method of claim 1 further comprising, after filtering out the fine fiber and protein from the separated solubles portion to define the fine fiber and protein portion and provide a remaining soluble solids portion, separating out a water soluble solids portion from the remaining soluble solids portion followed by filtering out residual protein from the water soluble solids portion and recycling the residual protein back to an earlier step in the method.

13. The method of claim 1 wherein the protein and fiber feed product includes at least 20% fiber.

14. The method of claim 1 wherein the protein and fiber feed product is incorporated into or defines a food product.

15. The method of claim 14 wherein the food product is a rumen feed, swine feed, chicken feed, or aqua feed.

16. The method of claim 1 wherein the protein and fiber feed product is incorporated or further processed into a biofuel or a pharmaceutical or chemical product.

17. A rumen feed, swine feed, chicken feed, or aqua feed that comprises the protein and fiber feed product obtainable by the method of claim 1.

18. A biofuel or a pharmaceutical or chemical product that comprises the protein and fiber feed product obtainable by the method of claim 1.

19. A system for producing a protein and fiber feed product from a whole stillage byproduct produced in a starch containing grain dry milling process for making biofuel and/or a biochemical, the system comprising:
    a first apparatus that receives the whole stillage byproduct and separates the whole stillage byproduct into an insoluble solids portion and a solubles portion, including fine fiber and protein, and;
    a second apparatus that is situated after the first apparatus and that receives the solubles portion, the second apparatus filters out the fine fiber and protein from the separated solubles portion, via a screen with openings, to define a fine fiber and protein portion; and
    a dewatering device that is situated after the second apparatus and that separately receives only the fine fiber and protein portion, the dewatering device dewaters the fine fiber and protein portion to produce a dewatered protein and fiber feed product.

20. The system of claim 19 further comprising a drying apparatus that is situated after the dewatering device and that receives the dewatered protein and fiber feed product, the drying apparatus dries the dewatered protein and fiber feed product.

21. The system of claim 19 wherein the first apparatus is selected from a filtration centrifuge, pressure screen, decanter centrifuge, paddle screen, desludging device, or dewatering press.

22. The system of claim 19 wherein the second apparatus is selected from a pressure screen or paddle screen.

23. The system of claim 19 wherein the dewatering device is selected from a decanter centrifuge, filter press, or rotary vacuum.

24. The system of claim 19 wherein the second apparatus, which includes screen openings of no greater than about 400 microns, filters out the fine fiber and protein from the separated solubles portion via the screen openings to define the fine fiber and protein portion.

25. The system of claim 19 wherein the protein and fiber feed product includes at least 15 wt % protein on a dry basis.

26. The system of claim 19 wherein the protein and fiber feed product includes at least 30 wt % protein on a dry basis.

27. The system of claim 19 wherein the protein and fiber feed product includes at least 20% fiber.

28. The system of claim 19 further comprising a drying apparatus that is situated after the dewatering device and that receives the dewatered protein and fiber feed product and the insoluble solids portion, wherein the drying apparatus dries the dewatered protein and fiber feed product and the insoluble solids portion.

\* \* \* \* \*